(12) United States Patent
Beckhaus et al.

(10) Patent No.: US 10,055,647 B2
(45) Date of Patent: Aug. 21, 2018

(54) METHOD AND SYSTEM FOR MONITORING LOGISTICS FACILITIES

(71) Applicant: Jungheinrich Aktiengesellschaft, Hamburg (DE)

(72) Inventors: Kai Beckhaus, Freising (DE); Manuel Preisker, Munich (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 125 days.

(21) Appl. No.: 14/958,163

(22) Filed: Dec. 3, 2015

(65) Prior Publication Data
US 2016/0165190 A1    Jun. 9, 2016

(30) Foreign Application Priority Data
Dec. 4, 2014    (DE) .................. 10 2014 224 884

(51) Int. Cl.
*H04N 7/18*        (2006.01)
*G06K 9/00*        (2006.01)
*G06Q 10/08*       (2012.01)

(52) U.S. Cl.
CPC ....... *G06K 9/00771* (2013.01); *G06Q 10/087* (2013.01); *H04N 7/18* (2013.01)

(58) Field of Classification Search
CPC ... B60R 25/102; G06K 9/00771; H04L 65/00; H04L 67/10; H04N 21/2187; H04N 21/23418
See application file for complete search history.

(56) References Cited

U.S. PATENT DOCUMENTS

| | | | |
|---|---|---|---|
| 2010/0042269 A1* | 2/2010 | Kokkeby | G01S 3/7864 701/3 |
| 2016/0035246 A1* | 2/2016 | Curtis | H04L 67/10 434/219 |

\* cited by examiner

*Primary Examiner* — Obafemi Sosanya
(74) *Attorney, Agent, or Firm* — Kilpatrick Townsend & Stockton LLP

(57) ABSTRACT

The invention relates to a method for monitoring processes and/or operating states in logistics facilities, in particular in roofed logistics facilities, comprising: providing a system which comprises at least one unmanned aerial vehicle (20), having at least one sensor, and comprises at least one data processing machine and at least one output device, detecting a current state of at least one characteristic in the logistics facility by means of the at least one sensor of the at least one aerial vehicle and transmitting the data representing the current state to the data processing machine, processing the data representing the current state by the data processing machine, wherein at least one processing result is obtained, and transmitting the at least one processing result to the output device, outputting the processing result by the output device, wherein the processing of the data transmitted by the at least one sensor comprises comparing the detected current state with a predetermined target state.

16 Claims, 1 Drawing Sheet

METHOD AND SYSTEM FOR MONITORING LOGISTICS FACILITIES

CROSS REFERENCE TO RELATED APPLICATION

This application claims the benefit of German Patent Application No. 10 2014 224 884.1, filed in Germany on Dec. 4, 2014, the entire contents of which are hereby incorporated herein by this reference.

DESCRIPTION

The invention relates to a method and to a system for monitoring processes and/or operating states in logistics facilities, in particular in roofed logistics facilities. In this case, at least one unmanned aerial vehicle equipped with at least one sensor is used, a detected current state in the logistics facility being compared with a predefined target state during processing of the data detected by the at least one sensor.

In modern logistics facilities, in particular roofed high-bay warehouses for example, a large number of processes are generally underway at the same time or in parallel, and therefore the facility is very dynamic. This very dynamic environment makes it difficult to identify erroneous states in the logistics facility. In these circumstances, continuous or high-frequency monitoring of current states is extremely time-consuming, expensive and resource-intensive. Furthermore, the staff present are not necessarily trained to identify errors occurring in the logistics facility, or it is impossible or possible only with great difficulty for the staff to identify erroneous states from their position, in particular from the floor of the facility. This is especially common in facilities where work is carried out with high-bay racking which may have an overall height of 10 meters or even more.

Owing to insufficient or inefficient monitoring, there can be errors in logistics facilities that are detected either very late or even not at all and affect the efficiency of the facility or can cause dangerous situations. This can include, for example, damage to high-bay racking which, in extreme cases, can lead to the racking collapsing, whereby, among other things, the employees may be put in danger.

If, however, an error is detected in time and can be proactively remedied, in the current example damaged shelves would be repaired or replaced in good time, so in most cases this is associated with relatively low direct costs. By contrast, however, undetected errors can cause extremely high resulting costs, for example in the event of a catastrophic failure of high-bay racking. For this reason, it is imperative to identify erroneous states in logistics facilities early.

As already mentioned, modern logistics facilities can only be monitored insufficiently from the facility floor since many of the processes involved occur at great height. Therefore, it would be desirable to use a monitoring system that has a greater degree of flexibility in terms of its position within the space. More recently, the use of unmanned aerial vehicles, known as drones, has been proposed when carrying out inventory operations in logistics facilities. However, the proposed systems are only capable of detecting logistics objects per se and of carrying out an inventory. The proposed systems do not make it possible to monitor any other processes or operating states in the particular logistics facility.

According to the invention, a method and a system are provided, by means of which it is possible to monitor processes and/or operating states in logistics facilities, in particular in roofed logistics facilities, the aim being in particular to identify errors, i.e. compare a detected current state with a predefined target state. To achieve this object, a method is provided, comprising the following steps: providing a system, which comprises at least one unmanned aerial vehicle, having at least one sensor, and comprises at least one data processing machine and at least one output device. By means of the at least one sensor of the at least one aerial vehicle, a current state of at least one characteristic in the logistics facility is detected and data representing this current state are transmitted to the data processing machine. Then, the data processing machine processes the data representing the current state, at least one processing result being obtained, which is in turn transmitted to the output device. Next, the output device outputs the processing result. In this case, according to the invention, processing the data transmitted by the at least one sensor comprises comparing the detected current state with a predefined target state. The sensor can be quite a complex element, e.g. a camera system having image analysis electronics, etc.

The method according to the invention allows for extremely flexible monitoring of a wide range of processes and operating states in logistics facilities and is subject to practically no spatial restrictions since the at least one unmanned aerial object can also easily monitor regions of the facility that are difficult to see from the floor. A monitoring system moving on the floor would affect other players in the operation of the facility, e.g. forklift trucks. Furthermore, processing the detected data directly is advantageous in that for example film material recorded by a camera does not have to undergo complex analysis by a system operator. Indeed, analysing image material in this way requires high numbers of staff and thus causes high ongoing costs, the efficiency of error identification by means of a simple visual analysis of film material also being debatable.

In a development, if a difference is determined when comparing the current state with the target state, the method according the invention can further comprise an evaluation of this difference, and the processing result can thus also comprise information on the result of the evaluation. In this development of the invention, for example errors or differences that have emerged on the basis of predetermined criteria can be classified into various risk categories such as "very critical", "critical" and "uncritical", urgency categories such as "take immediate countermeasures", "take countermeasures at the next convenient point" and "no countermeasures required at this time, merely increased monitoring", or error categories such as "danger to life", "process at risk" or "process efficiency reduced". An evaluation of this type can help make the monitoring method according to the invention even more efficient since it can relieve an operator of the system in question of at least one part of the assessment of the difference.

In addition, the method according to the invention can be developed such that the output device forwards the obtained processing result to a management system, which runs predefined processes on the basis of the processing result. For example, if incorrect or imprecise placements are identified or if pallets have been mixed up in a high-bay racking, the management system could directly initiate a correction task on the basis of the obtained processing result. Accordingly, this development of the invention also provides an increased degree of automation and thus further increases the efficiency of monitoring and possibly of error correction in a logistics facility.

In addition, the output device can visually display the processing result to a user or operator of the system in question and/or optionally notify said user by means of an acoustic signal when the processing result satisfies a predetermined condition. In this context, known technologies in connection with the optical preparation and presentation of data can be used, such as computer systems, mobile devices, e.g. tablet computers or mobile telephones, which present data to the user of the system by means of known and appropriate software. Furthermore, an acoustic warning, e.g. a siren, can also be triggered in particular when a state endangering safety is determined in the logistics facility.

Advantageously, the detection of the current state comprises recording three-dimensional information by the at least one sensor provided in the unmanned aerial vehicle. In this respect, suitable known types of sensor can be used, e.g. a PMD camera, a laser scanner and/or an ultrasonic device. Such types of sensor allow the respective positions of for example pallets in high-bay racking or the like to be monitored in a simple manner.

In a further advantageous embodiment, the method is characterised in that the aerial vehicle can fly autonomously. This means that the flight of the aerial vehicle does not have to be controlled remotely by a system operator, but instead the aerial vehicle flies on predetermined routes in the logistics facility, it being possible on one hand for the vehicle to fly cyclically on a predetermined route or alternatively for the vehicle to fly towards certain points more frequently, for example points at which a state requiring increased monitoring has been determined. Alternatively, it is of course also possible for the flight of the at least one unmanned aerial vehicle to be manually remote-controlled by a system operator.

The method according to the invention is extremely flexible in terms of the nature of the characteristics to be monitored. Examples of such characteristics include a clear object identifier, object position, object condition, a person's authorisation and a person's equipment. More specifically, it can be the position of a pallet in a high-bay racking, as mentioned above. On the other hand, however, the requirement to wear a helmet in a logistics facility can also be monitored by means of the method and system according to the invention.

The system according to the invention for monitoring processes and/or operating states in logistics facilities, in particular in roofed logistics facilities, comprises the following elements: at least one unmanned aerial vehicle, which comprises at least one sensor and is designed to detect a current state of at least one characteristic in the logistics facility by means of the at least one sensor; at least one data processing machine which is or can be coupled for communication with the sensor in order to receive data representing the current state from the at least one sensor and which is also designed to process the data representing the current state, at least one processing result being obtained; and at least one output device which is or can be coupled for communication with the data processing machine in order to receive the processing result and is also designed to output the processing result. In this respect, the system is characterised in that the processing machine comprises a memory and/or operatively communicates with a memory device, in which data representing a predefined target state are stored, and the machine is also designed to compare the detected current state with the at least one predefined target state when processing the data received from the sensor.

In a development, the system can further comprise a management system and/or communicate with an external management system, which is turn is designed to receive the processing result output by the output device and to run predefined processes on the basis of the processing result.

The data processing machine of the system according to the invention can in particular be provided in the at least one aerial vehicle. This structural measure provides the system with further increased flexibility since, in particular when a plurality of aerial vehicles is used, the data flows required between the components can be reduced by the data not being processed centrally. Alternatively, it is of course also possible to provide at least part of the data processing machine outside the aerial vehicle, for example in the form of a computer provided in the logistics facility. In this case, the data can for example be transmitted wirelessly between the sensor of the aerial vehicle and the data processing machine.

Advantages and details of the present invention will be described in more detail by way of example by means of the embodiment shown in the following schematic drawings, in which.

Figure 1:
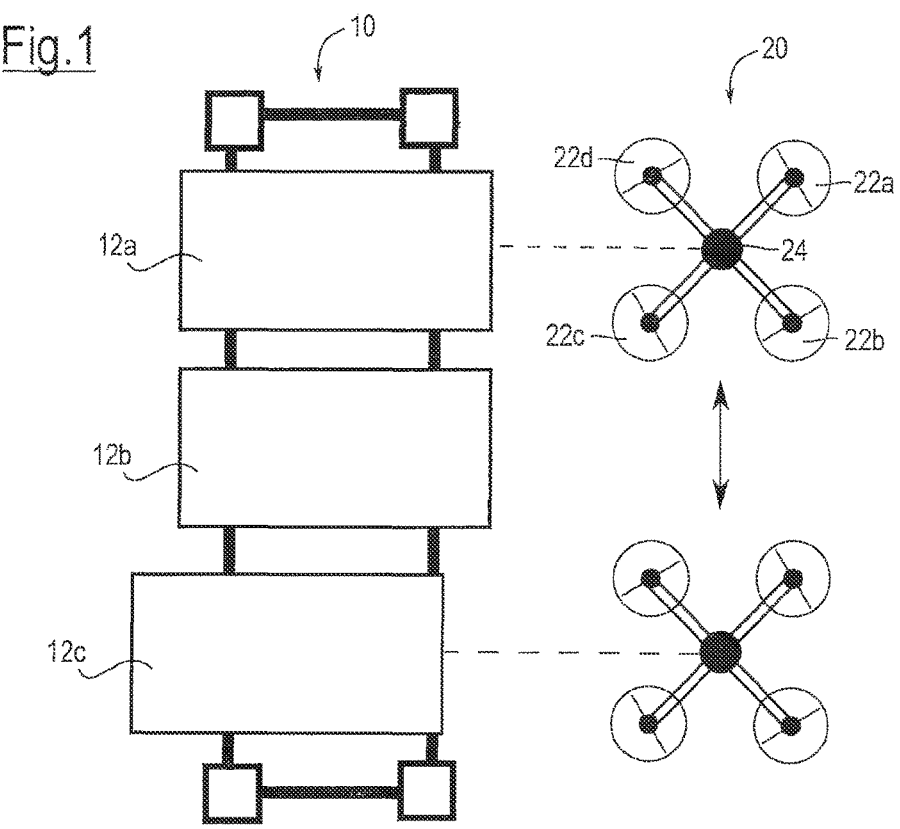
FIG. 1 is a schematic plan view of pallets in a shelf, the position of which pallets is detected by an aerial vehicle flying past.

FIG. 1 is a schematic plan view of high-bay racking 10 of a logistics facility, on which there are three pallets 12a, 12b and 12c. An unmanned aerial vehicle 20, which is shown in two positions in FIG. 1, is flying in the region of this high-bay racking. The aerial vehicle 20 is in the form of a quadcopter comprising four propellers 22a, 22b, 22c, 22d which provide the aerial vehicle 20 with complete freedom of movement in the three-dimensional space, including hovering at a fixed point. The individual propellers 22a to 22d are connected to a platform 24 of the aerial vehicle 20 by means of four struts, and can for example be operated in a known manner by means of individual electric motors located in each case in the hub of each propeller 22a to 22d. In the platform 24 of the aerial vehicle 20, there is a control device for the individual propellers 22a to 22d, as well as other devices, e.g. steering elements for the autonomous flight on a predetermined route through a logistics facility, possibly at least one gyroscope, and at least one sensor and a data transmission apparatus connected for communication to a data processing machine. In the embodiment shown, this sensor can for example be a PMD sensor (photonic mixer device) that can record three-dimensional images of its surroundings by means of a light propagation time method. The recording direction of the PMD sensor is roughly indicated schematically in FIG. 1 by the dashed line. In this case, the aerial vehicle 20 shown at the top in the figure detects the three-dimensional position of the pallet 12a on the racking 10. The data detected by the PMD sensor can then be analysed by the data processing machine (not shown) connected wirelessly to the aerial vehicle for data transmission. In the present case, the data processing machine will determine on the basis of the detected data that the pallet 12a is positioned properly on the high-bay racking 10, i.e. that this pallet does not pose any danger.

On the other hand, it can be determined by the processing machine that the position of the pallet 12c on the high-bay racking 10, as detected by the PMD sensor of the aerial vehicle 20 in the position shown at the bottom in the drawing, differs from the predetermined target state assumed by the pallets 12a and 12b. On the basis of the difference of the current position of the pallet 12c from its target position, the processing machine can determine, as a processing result, that the pallet is not in a permitted position, and for example can emit a warning to a system operator regarding a danger caused by an incorrect position of the pallet 12c, as well as for example a position and/or identifier of the pallet 12c.

Figure 2:
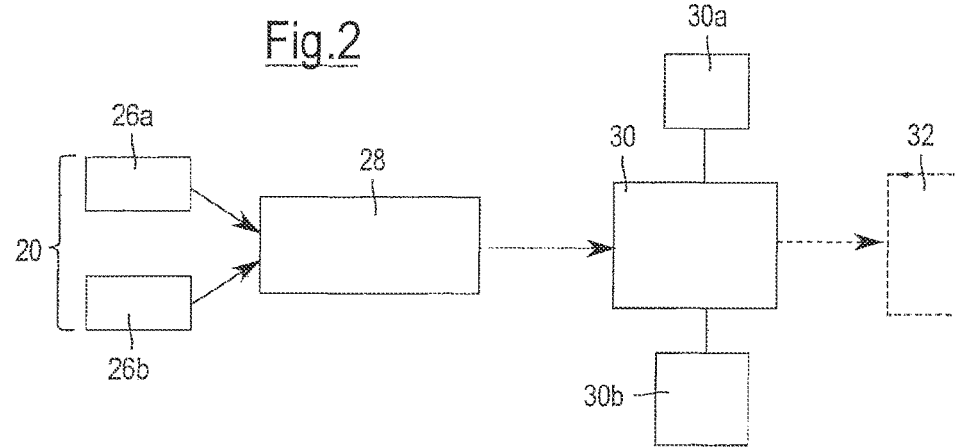
FIG. 2 is a schematic block diagram of the monitoring system according to the invention.

In FIG. 2, the system according to the invention is shown roughly in a schematic block diagram. In this case, the two sensors 26a and 26b are located in an unmanned aerial vehicle 20. The sensors 26a and 26b are designed to detect current states of a characteristic in a logistics facility, for example the position of the pallets 12a and 12b in FIG. 1. The sensors 26a and 26b forward data representing the detected current state to a data processing machine 28. Said machine compares the current state detected by the sensors 26a and 26b with a predetermined target state, which is represented by data stored in the data processing machine 28. Furthermore, when the data processing machine 28 determines that the current state differs from the predefined target state, it can also evaluate the difference, for example assess how critical the difference in question is for operational safety, for example. The result of the data processing and optionally information on the result of the evaluation of the difference are then forwarded to the output device 30 by the data processing machine 28. Said output device comprises a monitor 30a and a siren 30b. On the monitor 30a, the operator of the system is shown the processing result output by the data processing machine 28 and optionally information on the result of the evaluation of the difference of the detected current state from the predefined target state. If it has been determined by the data processing machine 28 that there is a particularly critical state in the logistics facility, the operator of the system can also be notified by the siren 30b.

Furthermore, the output device 30 can optionally forward the processing result to a management system 32 of the logistics facility, which system can directly initiate predefined processes on the basis of the data thus received.

The invention claimed is:

1. A method for monitoring processes and/or operating states in a roofed logistics facility, comprising:
providing a system, the system comprising:
at least one unmanned aerial vehicle having at least one sensor, the sensor capable of providing three-dimensional information;
at least one data processing machine;
at least one output device;
detecting a current state of at least one characteristic in the roofed logistics facility by means of the three-dimensional information provided by the at least one sensor of the at least one aerial vehicle and transmitting the data representing the current state to the data processing machine, wherein the current state includes a position of an object in a high-bay racking of the roofed logistics facility;
processing the data representing the current state by the data processing machine, at least one processing result being obtained, and transmitting the at least one processing result to the output device;
outputting the processing result by the output device;
wherein the processing of the data transmitted by the at least one sensor comprises comparing the detected current state with a predetermined target state, wherein the predetermined target state includes a permitted position of the object, wherein the permitted position is determined based on the three-dimensional information indicating i) the position of the object relative to the high-bay racking and ii) an additional position of an additional object relative to the high-bay racking.

2. The method according to claim 1, wherein, if a difference is determined between the current state and the predetermined target state, the comparison of the current state with the predetermined target state further comprises evaluating the difference, and the processing result comprises information on the result of the evaluation.

3. The method according to claim 1, wherein the output device outputs the processing result to a management system, which runs predefined processes on the basis of the processing result.

4. The method according to claim 1, wherein the output device optically displays the processing result to a user and/or optionally notifies said user by means of an acoustic signal if the processing result satisfies a predetermined condition.

5. The method according to claim 1, wherein the detection of the current state comprises recording three-dimensional information by the at least one sensor.

6. The method according to claim 1, wherein the at least one aerial vehicle flies autonomously.

7. The method according to claim 1, wherein the at least one characteristic includes a characteristic from: a clear object identifier, an object position, an object condition, a person's authorization, a person's equipment.

8. A system for monitoring processes and/or operating states a roofed logistics facility, comprising:
at least one unmanned aerial vehicle which comprises at least one sensor, the sensor capable of providing three-dimensional data, wherein the unmanned aerial vehicle is designed to detect a current state of at least one characteristic in the roofed logistics facility by means of the three-dimensional data provided by the at least one sensor, wherein the current state includes a position of an object in a high-bay racking of the roofed logistics facility;
at least one data processing machine which is or can be coupled for communication with the at least one sensor of the aerial vehicle in order to receive data representing the current state from the at least one sensor, and is also designed to process the data representing the current state, at least one processing result being obtained;
at least one output device which is or can be coupled for communication with the data processing machine in order to receive the processing result and is also designed to output the processing result;
wherein the data processing machine comprises a memory and/or operatively communicates with a memory device, in which data representing a predetermined target state are stored, wherein the predetermined target state includes a permitted position of the object, wherein the permitted position is determined based on the three-dimensional data indicating i) the position of the object relative to the high-bay racking and ii) an additional position of an additional object relative to the high-bay racking, and
wherein the data processing machine is also designed to compare the detected current state with the at least one predetermined target state when processing the three-dimensional data received from the at least one sensor.

9. The system according to claim 8, wherein the system further comprises a management system and/or communicates with an external management system which is designed to receive the processing result output by the output device and to run predefined processes on the basis of the processing result.

10. The system according to claim 8, wherein the output device comprises means for optically displaying the processing result and/or means for acoustically notifying a user if the processing result satisfies a predetermined condition.

11. The system according to claim 8, wherein the at least one sensor comprises a photonic mixer device camera, a laser scanner and/or an ultrasonic apparatus.

12. The system according to claim 8, wherein the at least one aerial vehicle is designed to fly autonomously.

13. The system according to claim 8, wherein the data processing machine is provided in the at least one aerial vehicle.

14. The system according to claim 8, wherein the data processing machine is formed separately from the at least one aerial vehicle and is wirelessly connected to the sensor of the at least one aerial vehicle for data transmission.

15. The method according to claim 1, further comprising determining that the detected current state requires increased monitoring.

16. The system according to claim 8, wherein the data processing machine is also designed to determine that the detected current state requires increased monitoring.

* * * * *